United States Patent [19]
Hindle et al.

[11] Patent Number: 5,746,540
[45] Date of Patent: May 5, 1998

[54] METHOD OF ISOLATING A NUCLEAR REACTOR OR OTHER LARGE STRUCTURES

[76] Inventors: David J. Hindle, 291 Lammer Court, Hammersmith Road, London W6 7LD UK, United Kingdom; Christopher D. Breeds, 5106 272nd Ave. NE, Redmond, Wash. 98053; Jeremy J. Conway, Well Cottage Burconbe Rd., Chalford Hill Stroud GC6 8BH UK, United Kingdom; Ian W. Morris, 1 Kendal Road, Hove, Sussex BN3 5HZ UK, United Kingdom; Eric Ledgerwood, 20 Rhandda Grove, London E3 5AP UK, United Kingdom

[21] Appl. No.: 643,771

[22] Filed: May 6, 1996

Related U.S. Application Data

[63] Continuation-in-part of Ser. No. 241,468, May 12, 1994, abandoned.

[51] Int. Cl.[6] .................................................. E02D 19/14
[52] U.S. Cl. .......................... 405/131; 376/461; 405/229; 405/249
[58] Field of Search .................................... 405/130, 131, 405/132, 249, 229, 232, 288, 290, 217; 52/127.1; 376/460, 461

[56] References Cited

U.S. PATENT DOCUMENTS

| | | | |
|---|---|---|---|
| 1,207,569 | 12/1916 | Langerfeld | 405/130 X |
| 2,291,680 | 8/1942 | Billner | 52/127.1 X |
| 2,561,676 | 7/1951 | Ruff | 405/131 |
| 3,755,079 | 8/1973 | Weinstein et al. | |
| 3,790,215 | 2/1974 | Fangel | 405/288 X |
| 3,990,249 | 11/1976 | Senn | 405/132 |
| 3,996,751 | 12/1976 | Hallenius et al. | |
| 4,242,012 | 12/1980 | Utt | 405/130 X |
| 4,313,795 | 2/1982 | Dauvergne | |
| 4,432,669 | 2/1984 | Cox et al. | 405/217 |
| 4,442,065 | 4/1984 | Latter et al. | |
| 4,483,790 | 11/1984 | Gaiser | |
| 4,815,894 | 3/1989 | Copson | |
| 4,923,338 | 5/1990 | Hertle et al. | |
| 4,990,026 | 2/1991 | Ofenstein | |
| 5,297,182 | 3/1994 | Cepkauskas | |

FOREIGN PATENT DOCUMENTS

| | | | |
|---|---|---|---|
| 0688651 | 9/1979 | U.S.S.R. | 405/290 |

*Primary Examiner*—Dennis L. Taylor
*Attorney, Agent, or Firm*—Robert B. Hughes; Hughes, Multer & Schacht, P.S.

[57] ABSTRACT

A method of entombing a nuclear reactor where the reactor with its bio-shield remains intact. An access shaft, several lateral adits, and several chambers below the reactor location are excavated to provide access at underground locations below the reactor. A main cavern is excavated and lined with a lower base, surrounding sidewall, and a roof structure which has thermal plate at its lower surface. Freeze/thaw pipes are erected vertically in the cavern, and these extend through the earth strata below the cavern into a lower operating chamber. The cavern is filled with water which is then frozen, and the earth strata immediately below the reactor and are isolated from the surrounding earth strata and structure. The upper surface of the ice block is melted by the thermal plate in a controlled manner to lower the reactor, after which concrete and other material is used to fill all of the man made cavities and thus entomb the reactor.

20 Claims, 16 Drawing Sheets

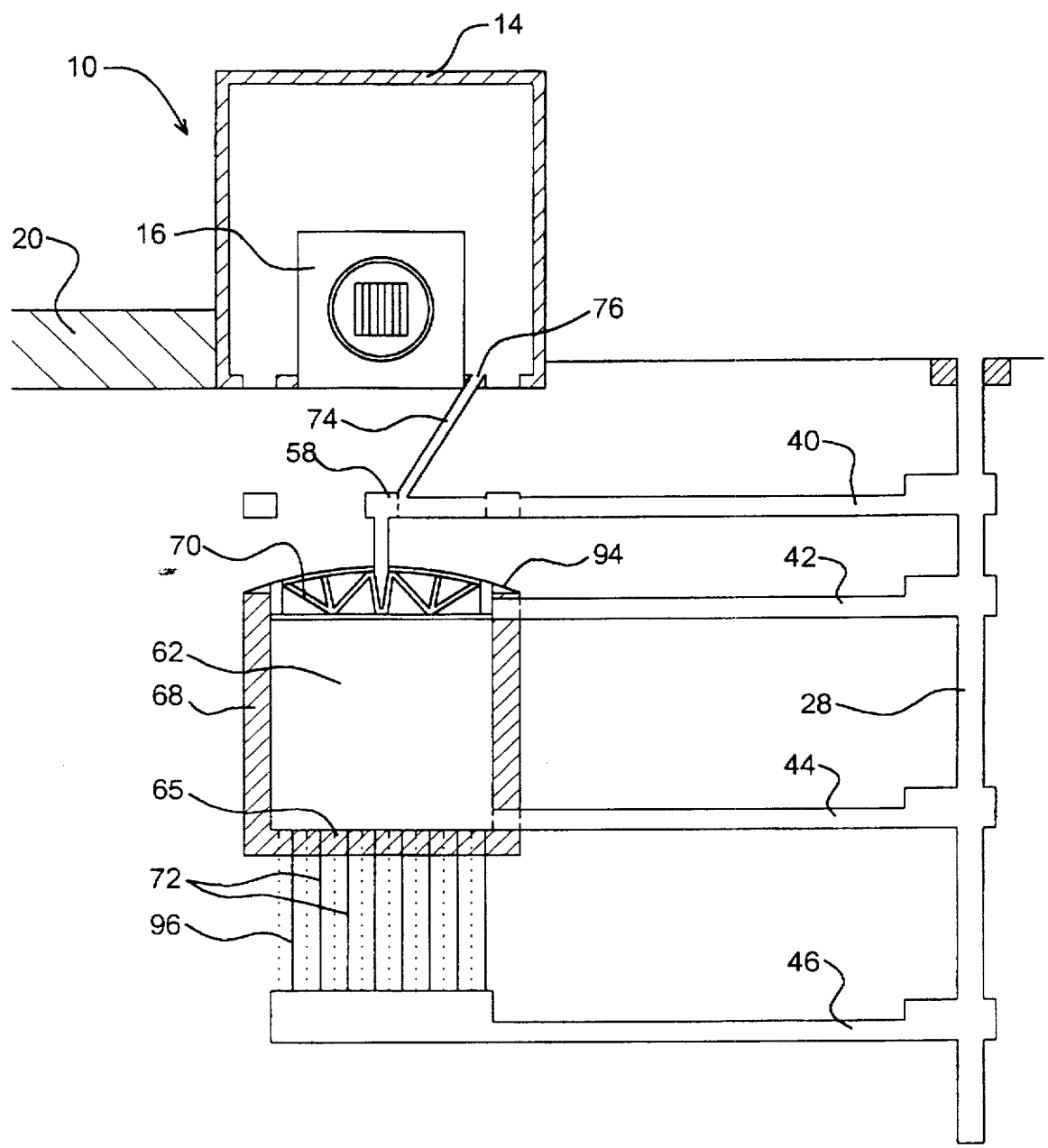

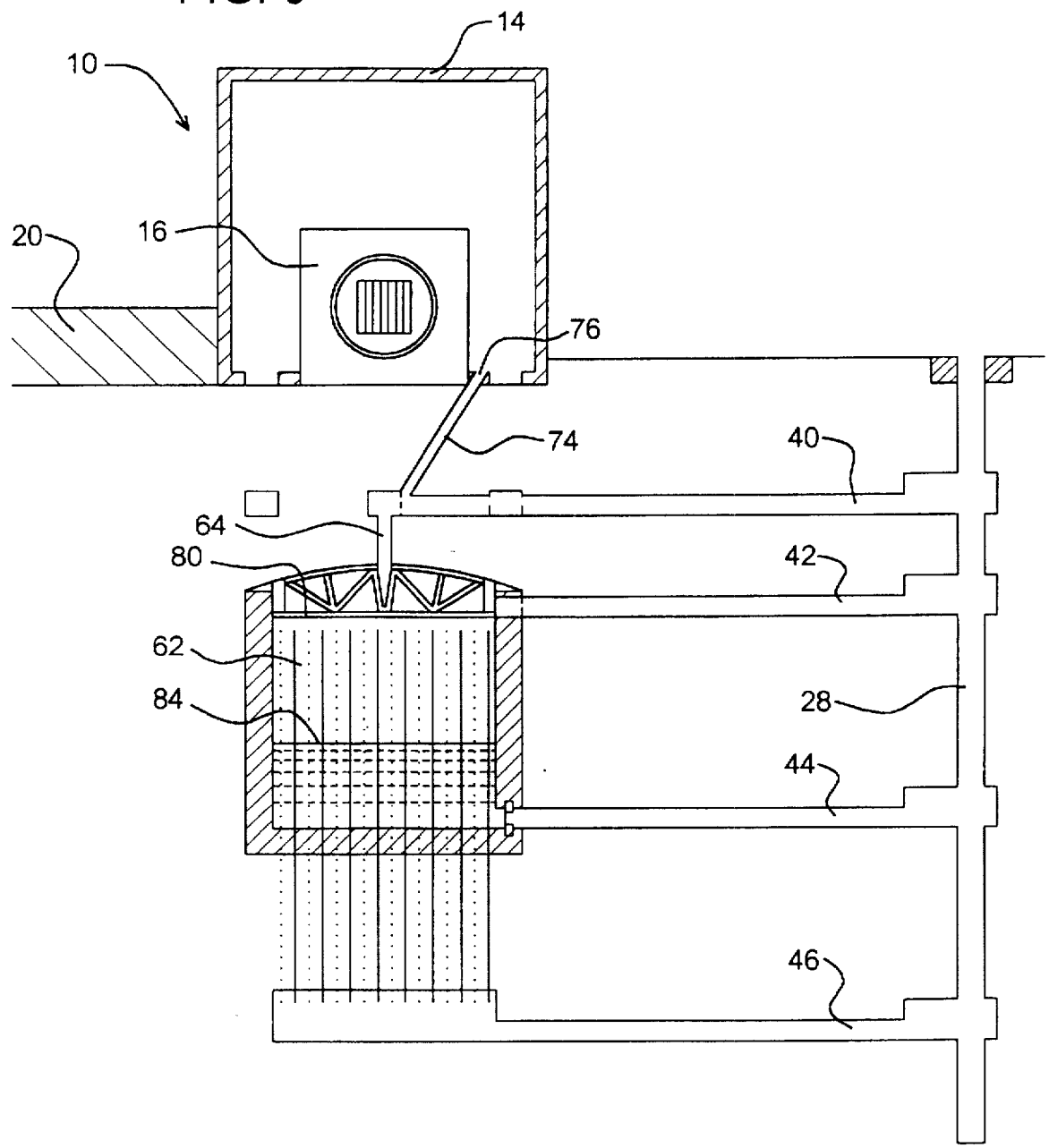

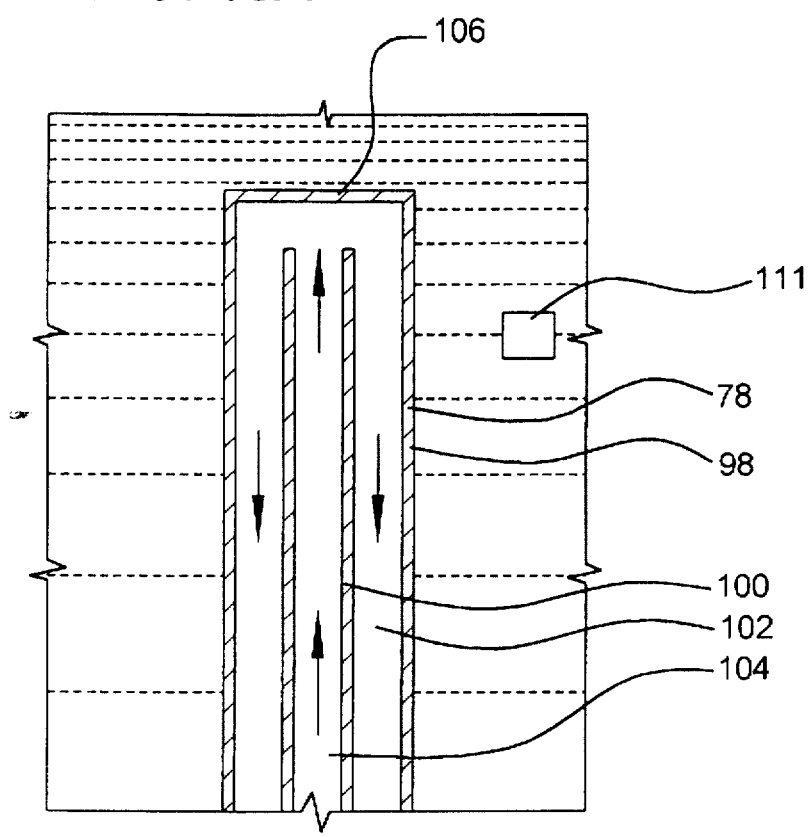

METHOD OF ISOLATING A NUCLEAR REACTOR OR OTHER LARGE STRUCTURES

CROSS REFERENCE TO RELATED APPLICATION

This is a continuation-in-part of application Ser. No. 08/241,468 filed on May 12, 1994, abandoned.

BACKGROUND OF THE INVENTION a) Field of the Invention

The present invention relates to a method and apparatus for isolating a large structure, such as a nuclear reactor, and more specifically to such a method and apparatus for controlled lowering of an intact nuclear reactor (or other large structure) into a specially prepared underground chamber, this being accomplished in the manner to meet appropriate environmental and regulatory standards.

b) Background Art

Currently defined decommissioning operations generally require the dismantling of the nuclear reactor components, with disposal in a mine or near-by surface repositories.

This requires first cutting, sectioning, and removal of radioactive components followed by loading to a shipping cart for transport to a disposal site. At the disposal site, components are placed and grouted into a disposal container ready for burial. The grout is allowed to air and the container, and waste, are transported to the disposal area and interred. Problems with such methods include:

Exposure to hazardous radiation during dismantling, packaging, transportation, repackaging, and transport to the disposal area;

Difficulty of handling large components;

Reliance of burial sites for long-term containment of radionuclides;

Unavailability of sites.

At present, for these and associated reasons, very few of the nuclear reactors slated for disposal have actually been decommissioned.

A search of the patent literature has disclosed the following.

U.S. Pat. No. 4,483,790 (Gaiser) discloses a method of disposing of a nuclear reactor by sinking it into the ground below. Several versions of the method are shown. In general, a tunnel or tunnels are dug below the location of the reactor. In the version shown in FIG. 5, a tunnel is dug and immediately filled with sand or another fluid filler that can be flushed out. Additional tunnels are driven at consecutive levels above the first tunnel up to a location beneath the foundation of the part of be sunk and are likewise filled. The reactor or power plant is subsequently lowered by flushing out the filler. The method of removing the filter is not specified. In addition, it is doubtful that such a medium (e.g., sand) could be removed in a controlled fashion.

U.S. Pat. No. 4,923,338 (Hertle et al) shows a process for lowering a nuclear power plant or building structure into the ground. A caisson is provided below the structure, and there is an outer ring which depends from the caisson and constitutes an outer cutting edge. There is also an inner ring forming an inner cutting edge. Hydraulic presses are arranged between the top surface of the inner ring and the bottom surface. The soil between the rings is excavated with the presses extended. A lowering sequence is initiated by retracting the presses so that the structure descends toward the inner ring. Then soil is excavated below the inner ring. The sequence is then repeated.

U.S. Pat. No. 4,990,026 (Ofenstein) shows a process for lowering a building structure such as a nuclear power plant. In an area below the building structure, super-atmospheric air is provided in an enclosed chamber to support the building. The excavated material is moved out through airlocks, as the super-atmospheric air supports the structure. There are numerous problems with this proposed technology. In particular, extensive experience using compressed air in tunneling has shown a general inability to control even low pressures near the ground surface.

U.S. Pat. No. 4,815,894 (Copson) shows a method of constructing a large diameter subsea bore hole (e.g. about 10 to 15 meters in diameter) by drilling smaller bore holes in a ring of large diameter around the circumference of the large bore hole to be dug, and supplying the smaller ring bore holes with material to stabilize the surrounding geologic formations. This can be accomplished, by providing a ring of sand which is frozen, for example, by brine pipes carrying brine chilled to about −30° C., with the wet sand freezing to form a rigid wall.

U.S. Pat. No. 5,297,182 (Cepkauskas) shows a method of decommissioning a nuclear reactor by incapsulating portions of the reactor vessel and materials into a solid reactor capsule, and then converting this reactor capsule into a plurality of decommissioned segments. This conversion is preferably accomplished by cutting the reactor capsule into transportable sized segments, and then encasing these segments.

U.S. Pat. No. 4,442,065 (Latter et al) discloses a "core catcher" to prevent the escape of radiation in the unlikely event of a major failure of a nuclear reactor by melt-down of the core. There is a narrow vertically downwardly extending isolation tube, and an aligned heat exchange structure forming a chilled wall crucible in which the molten uranium oxide forms a container for itself.

U.S. Pat. No. 3,755,079 (Weinstein et al) shows a nuclear reactor installation where there is a burial chamber communicating with the reactor chamber. The disposal of a reactor pressure vessel at the expiration of its operational life is accomplished by moving it into this burial chamber. This burial chamber is part of the initial construction of the facility.

U.S. Pat. No. 4,313,795 (Daubergne) shows what is called a "nuclear power plant with on-site storage capabilities". This is arranged so that there is a discharge mechanism for dumping the reactor core when spent into a lower radioactive material storage of the pressure vessel.

U.S. Pat. No. 3,996,751 (Hallenius et al) discloses a method of blasting and reinforcing rock cavities. Before the rock cavity is completely excavated, there is a plurality of tunnels formed between the top and bottom levels of the cavity at locations outside the future walls of the cavity. These tunnels are filled with reinforcing materials, preferably concrete, so as to form a rib-like reinforcement which is wholly embodied in the rock surrounding the rock cavity.

SUMMARY OF THE INVENTION

The method and apparatus of the present invention enables a critical structure, such as a nuclear reactor unit or other large structure, to be lowered into the earth strata where it can be properly entombed or otherwise isolated to answer environmental needs and meet regulatory standards. A significant advantage of the present invention is that this can be accomplished by interring the reactor with its existing bio-shield intact, thus preserving an important, existing engineered barrier.

In the method of the present invention, a cavern is excavated in the ground strata at a location below the critical structure, and the cavern is then filled to a predetermined support level with water.

Thereafter the water is frozen to form an ice support. This is followed by isolating the critical structure and any underlying portion of the ground strata positioned between the critical structure and the cavern, and then thawing the ice support to cause the critical structure, along with any of said underlying portion of the ground strata to descend into the ground strata toward the cavern.

In a preferred form, the method comprises placing an upper heat transfer structure at an upper location of the cavern, and transferring heat from the upper heat transfer structure to an upper portion of the ice support to melt the ice support downwardly and thus lower the critical structure toward the cavern. The melted water is conveniently moved upwardly through passageway means to be removed from the cavern.

Desirably there is provided in the cavern a vertically aligned enclosing sidewall to define an ice forming chamber. The method further comprises filling the ice forming chamber with the water and freezing the water to form the ice support within the sidewall, with the heat transfer base structure descending into the ice forming chamber.

Also, in the preferred form, the underlying portion of the ground strata below the critical structure is isolated by excavating a portion of ground strata surrounding said underlying portion of the ground strata to be supported primarily by the ice support.

The method further comprises, in the preferred form, placing a plurality of freeze pipes in the cavern, and passing a cooling heat exchange medium through the freeze pipes to cause the water to freeze to form the ice support. The freeze pipes are lowered downwardly in the cavern by heating the freeze pipes to melt ice adjacent thereto and then lowering the freeze pipes. More particularly, the freeze pipes are lowered at least partially into a lower operating chamber positioned beneath the cavern. Then the cooling medium is passed through the freeze pipes to maintain a desired temperature in the ice support.

A generally vertical access shaft is formed into the ground strata at a location spaced laterally from the critical structure. The method then comprises forming laterally extended adit means to an area adjacent to the ground strata location below the critical structure, and then excavating the cavern by passing the excavated material through the adit means and through the access shaft. More particularly, the method comprises forming a second adit means leading from the access shaft to a location adjacent to an area below the critical structure, and forming a ring adit extending around an area below the critical structure. Then the underlying portion of the ground strata is isolated by excavating the material between the ring adit and an upper location adjacent to and extending around a location of the critical structure.

Also in the preferred embodiment, the method further comprises forming an adit from the access shaft laterally to a location beneath a cavern, and forming an operating chamber beneath the cavern. Vertical holes are formed to the ground strata extending from the cavern to the operating chamber. The freeze pipes are then inserted to extend into the vertical holes and also extend upwardly into the cavern. The freeze pipes are lowered downwardly in the cavern by heating the freeze pipes to melt ice adjacent thereto, and then lowering the freeze pipes. Then more of the cooling medium is passed through the freeze pipes to maintain desired temperature in the ice support.

The method further comprises forming in the cavern a lower based structure over a bottom surface of the cavern, forming a vertically oriented surrounding sidewall defining an ice forming chamber within the cavern, and then forming a roof support structure at an upper location of the cavern above the ice forming chamber.

The method further comprises forming the heat transfer structure with heat transfer sections, and then selectively controlling the temperature of the heat transfer sections to control the rate of melting adjacent to the heat transfer sections so as to orient the heat transfer structure properly. In the preferred embodiment, the heat transfer structure comprises heating elements which are heated electrically, and these can be selectively heated to properly orient the heat transfer structure.

The invention further comprises an entombed critical structure installation made in accordance with the present invention, and more particularly a nuclear reactor unit. Other features of the present invention will become apparent from the following detailed description.

BRIEF DESCRIPTION OF THE DRAWINGS

FIGS. 1 through 13 are side elevational views, drawn partly in section, showing the nuclear reactor facility and the underlying earth strata, and further illustrating the sequence of steps in the present invention. The individual Figures will now be described briefly;

FIG. 1 shows a typical nuclear reactor, with the adjacent buildings where the reactor has been closed and is awaiting decommissioning;

FIG. 2 illustrates sinking of the access shaft and also the isolation of the reactor unit from the building foundation;

FIG. 3 illustrates the further excavation, construction of the shaft stations (cavern enlargements adjacent to the shaft) and the driving of the horizontal tunnels (adits) from the shaft stations;

FIG. 4 illustrates the further excavation to extend the adits and form several chambers beneath the nuclear reactor unit, and also of the excavation to form a "ring adit" (an adit that closes on itself);

FIG. 5 illustrates the further excavation to form the main cavern and also the construction of an operating shaft from the roof of the cavern to a central chamber at the location of the ring adit;

FIG. 6 illustrates the preparation of the base structure on the floor of the main cavern;

FIG. 7 shows the completion of the support structure in the main cavern, conductor holes for the freeze/thawing pipes, and an inclined operating shaft from the central chamber to the reactor foundation;

FIG. 8 shows the installation of the upper thermal plate at the cavern roof, and the installation of the freeze/thaw pipes in the main cavern and also through the holes extending downwardly from the main cavern through the earth strata to the lower operating chamber;

FIG. 9 shows the main cavern being filled with water;

FIG. 10 illustrates the process of freezing the water to form the ice support structure and also the excavation around the underlying earth strata below the reactor unit so as to isolate the reactor unit and its adjacent lower earth strata portion from the rest of the earth strata;

FIG. 10A is an enlarged sectional view showing the upper end of one of the freeze/thaw pipes;

FIG. 11 illustrates the method of the controlled melting of the upper surface of the ice support, thus lowering the reactor unit along with its underlying earth strata core immediately below;

FIG. 12 illustrates the position reached when the ice structure is entirely melted, and the roof structure is now positioned resting on the lower base structure;

FIG. 13 illustrates the final steps of backfilling and sealing the entombed reactor to ground level, sealing all man made penetration made to the entombment area, and capping the access shaft.

DESCRIPTION OF THE PREFERRED EMBODIMENT

1. Introduction

It is believed a clearer understanding of the present invention will be obtained by first providing (after this Introduction) in Section 2 an overall description of the method and apparatus of the present invention, and following this in Section 3 with a more detailed description of specific features of the same.

Figure 1:
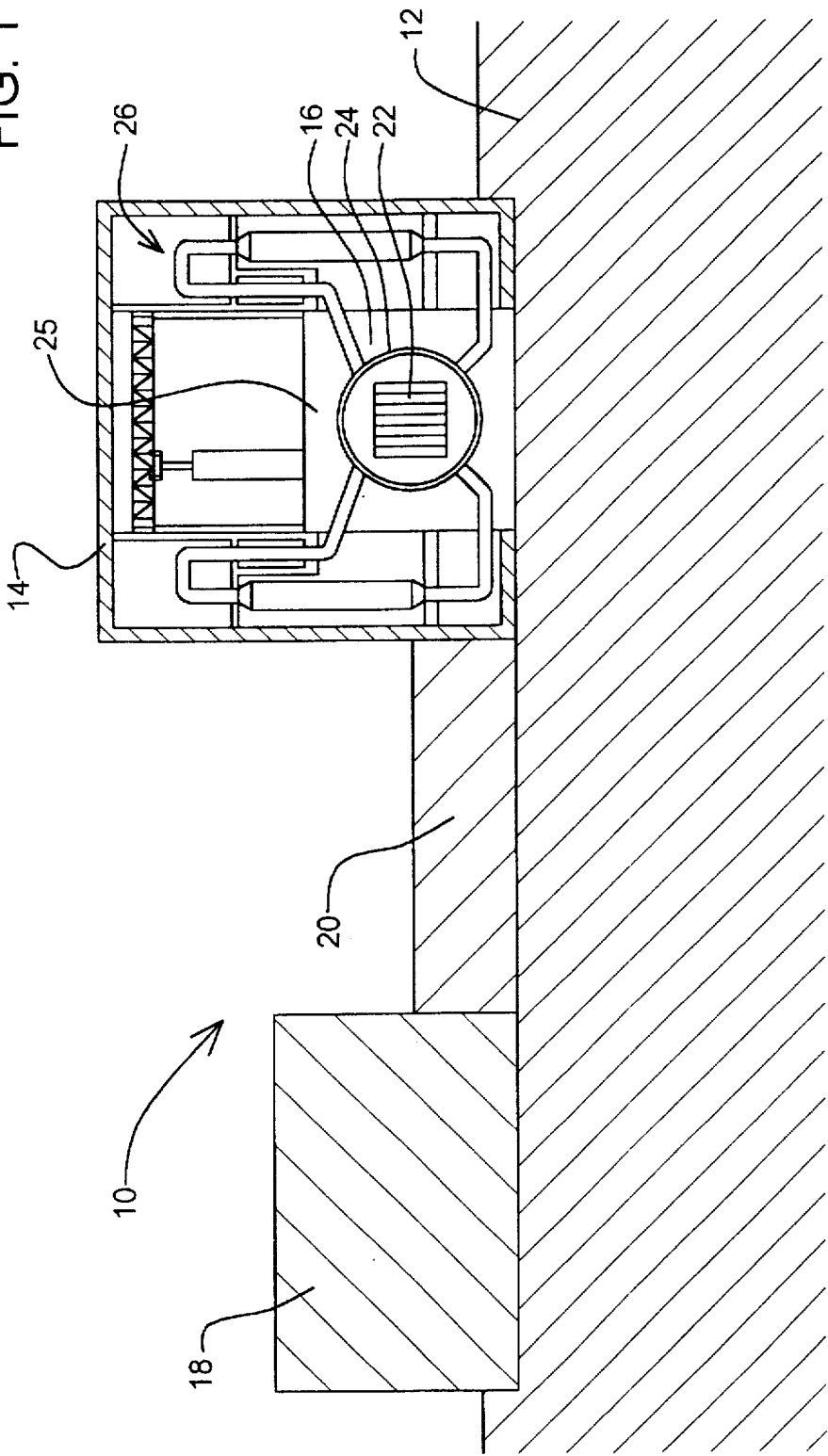

Reference is initially made to FIG. 1 which shows a typical nuclear reactor power plant facility 10 which rests upon the ground strata 12. In the following description, the ground strata 12 will be assumed to be relatively stable, such as a rock formation, or at least a ground formation which would lend itself to tunnelling and chamber excavation, with conventional soil or strata stabilizing methods being used.

The nuclear reactor power plant facility 10 is shown as comprising a reactor building 14, with a reactor 16 being positioned therein. Further, there is a steam turbine power plant 18 or the like, with conduits (shown schematically at 20) extending between the power plant into the reactor building 14 and to the reactor unit 16.

Typically, the reactor 16 would comprise a reactor core 22 encased in a steel pressure vessel 24, which in turn is enclosed in reinforced concrete bioshield 25. The building 14 would also contain ancillary equipment, such as heat exchangers, pumps, pipe work, etc. together with fuel rod charging equipment, gantry, etc. These are simply given the broad numerical designation 26. As indicated above, the reactor building connects with the steam conduit halls which in turn connects to the power plant 18. In the power plant 18, there would be turbine rooms, transformers, switching gears, etc. Typically, there would be a large concrete slab 27 which is beneath the building 14 and also beneath the reactor 16.

2. General Description of the Process and Apparatus a. Initial Excavation (FIGS. 2–5)

Figure 2:
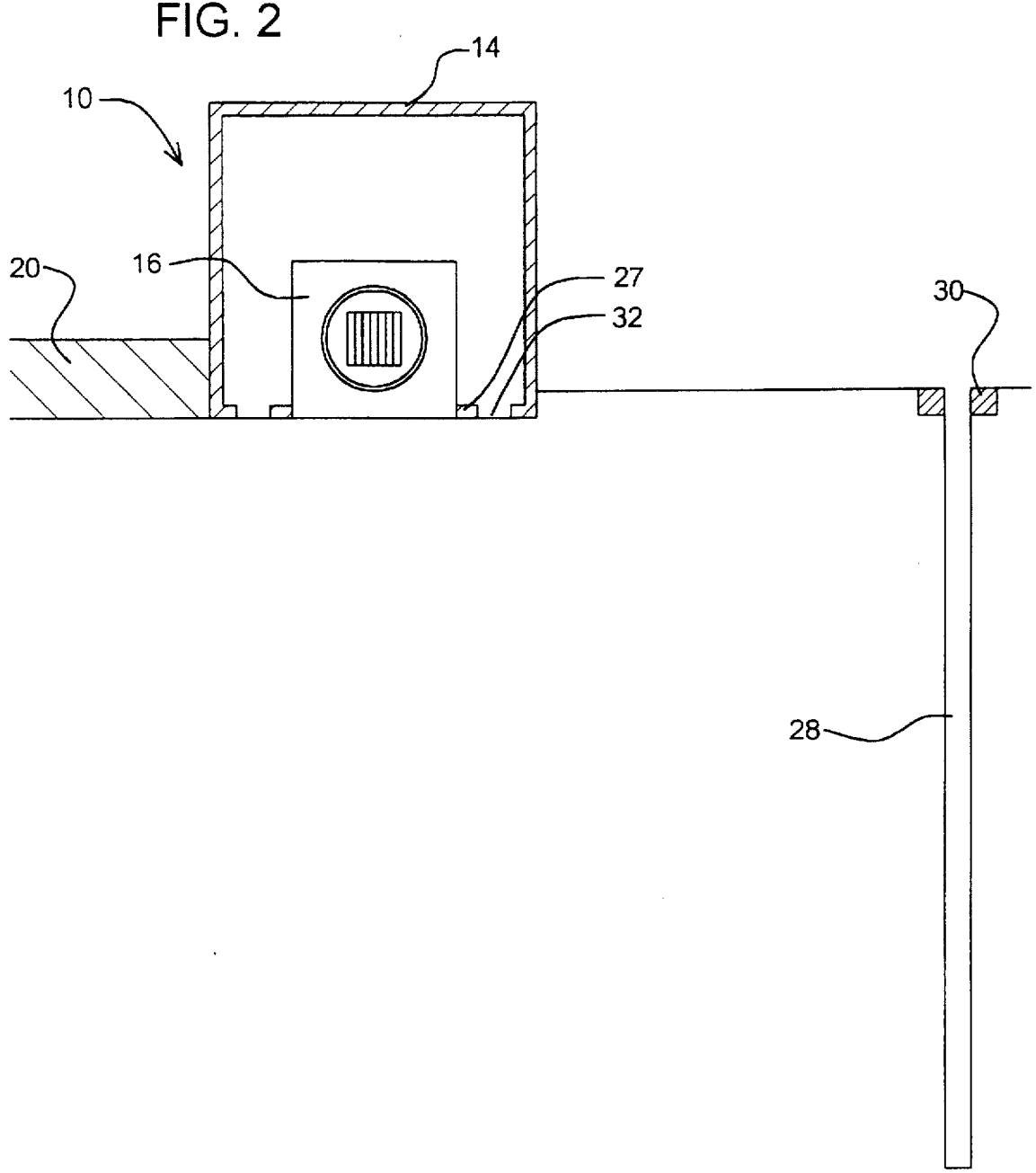

This will be described with reference to FIGS. 2 through 5. As shown in FIG. 2, the initial step is to sink a vertical access shaft 28, and provide this with an upper support collar 30. The next step (also shown in FIG. 2) is to isolate the reactor 16 by breaking up and removing a portion 32 of this concrete slab 27 surrounding the reactor 16.

Figure 3:
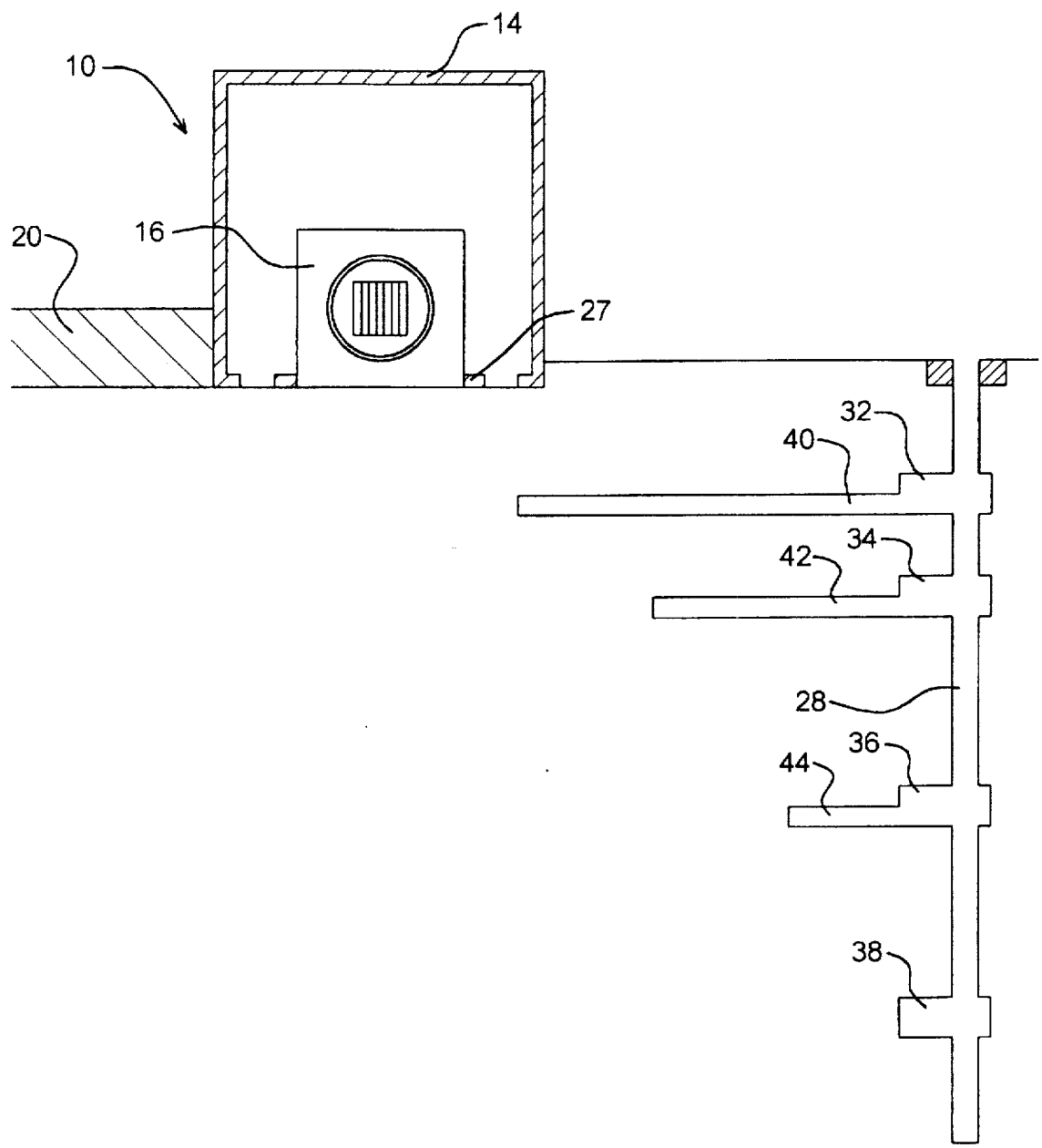
Figure 4:
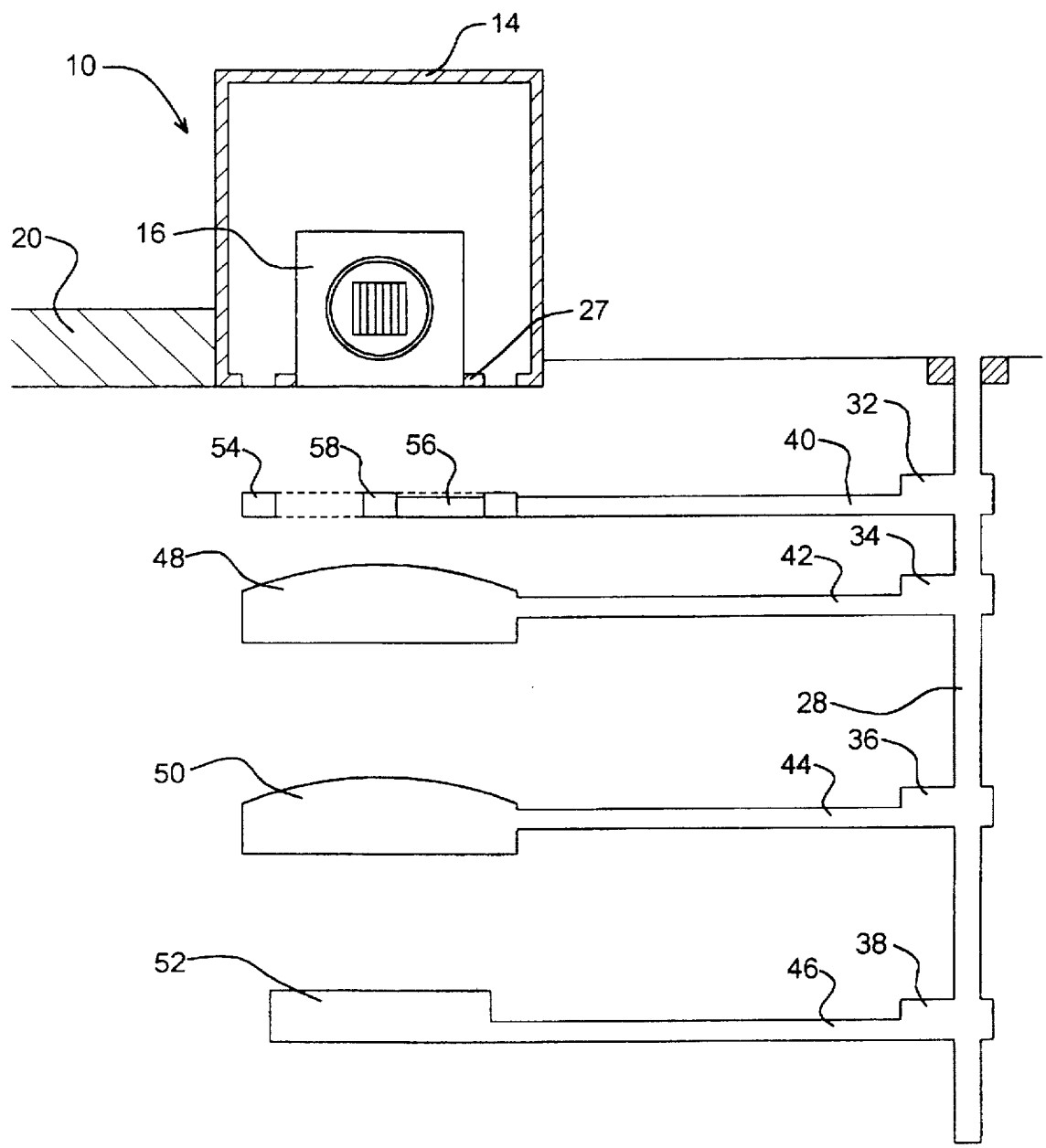

In FIG. 3, there is shown the digging of the enlarged shaft station chambers 32 through 38 at locations along the length of the shaft 28. Then the horizontal tunnels (adits) are dug from the access shaft 28 toward a location below the reactor unit 16. In FIG. 4, the adits are shown as having been completed, and these are designated 40 through 46, respectively. Further, at the end of the two middle adits 42 and 44, upper and lower main chamber sections 48 and 50, respectively, are excavated. A lower operating chamber 52 is excavated at the end of the adit 46. Then at the end of the uppermost adit 40, a ring adit 54 is excavated, and a connecting tunnel 56 is excavated from the ring adit 54 to a central chamber 58 in the center of the ring adit 54 and directly below the center of the reactor 16.

Figure 5:
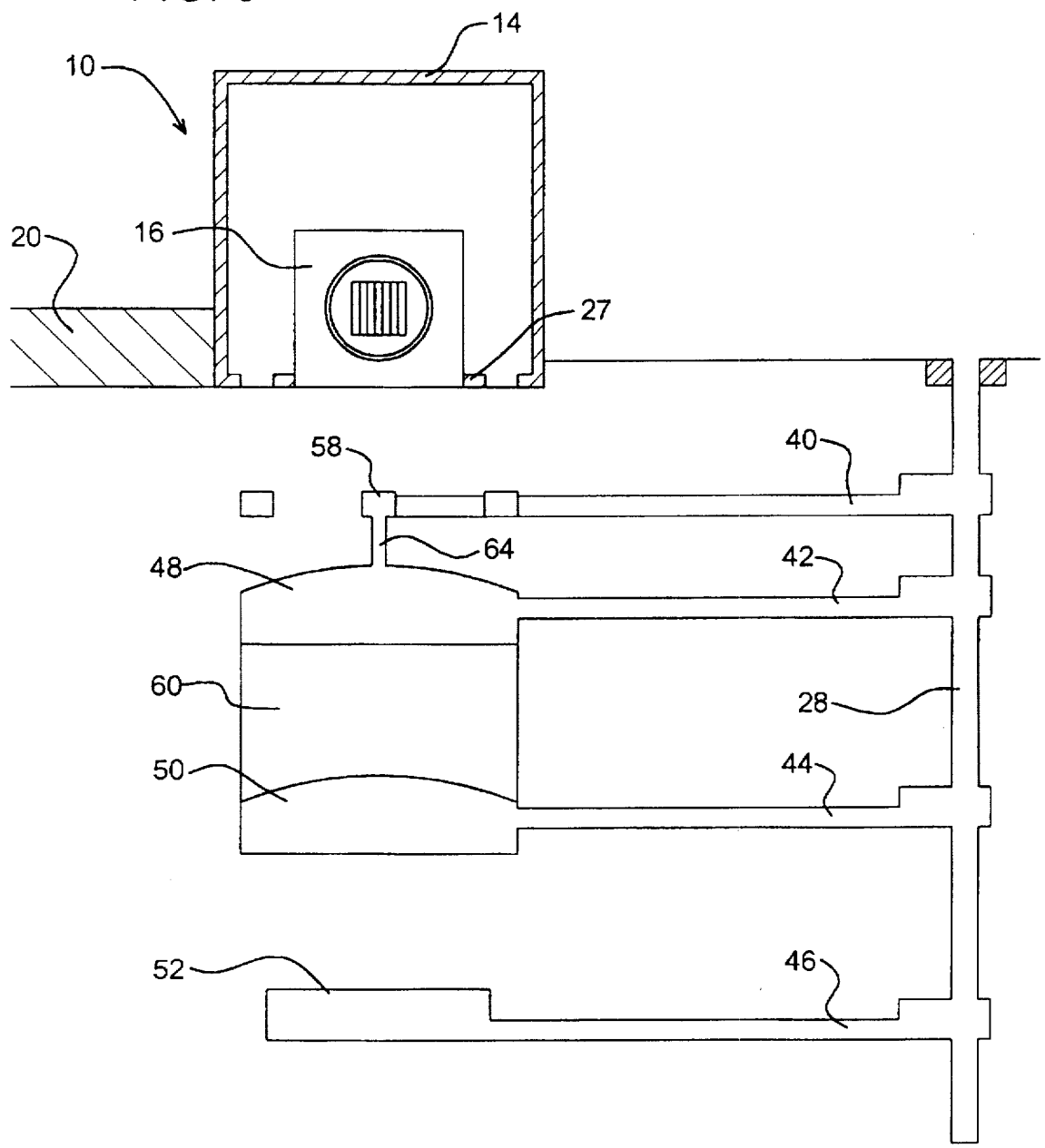
Figure 6:
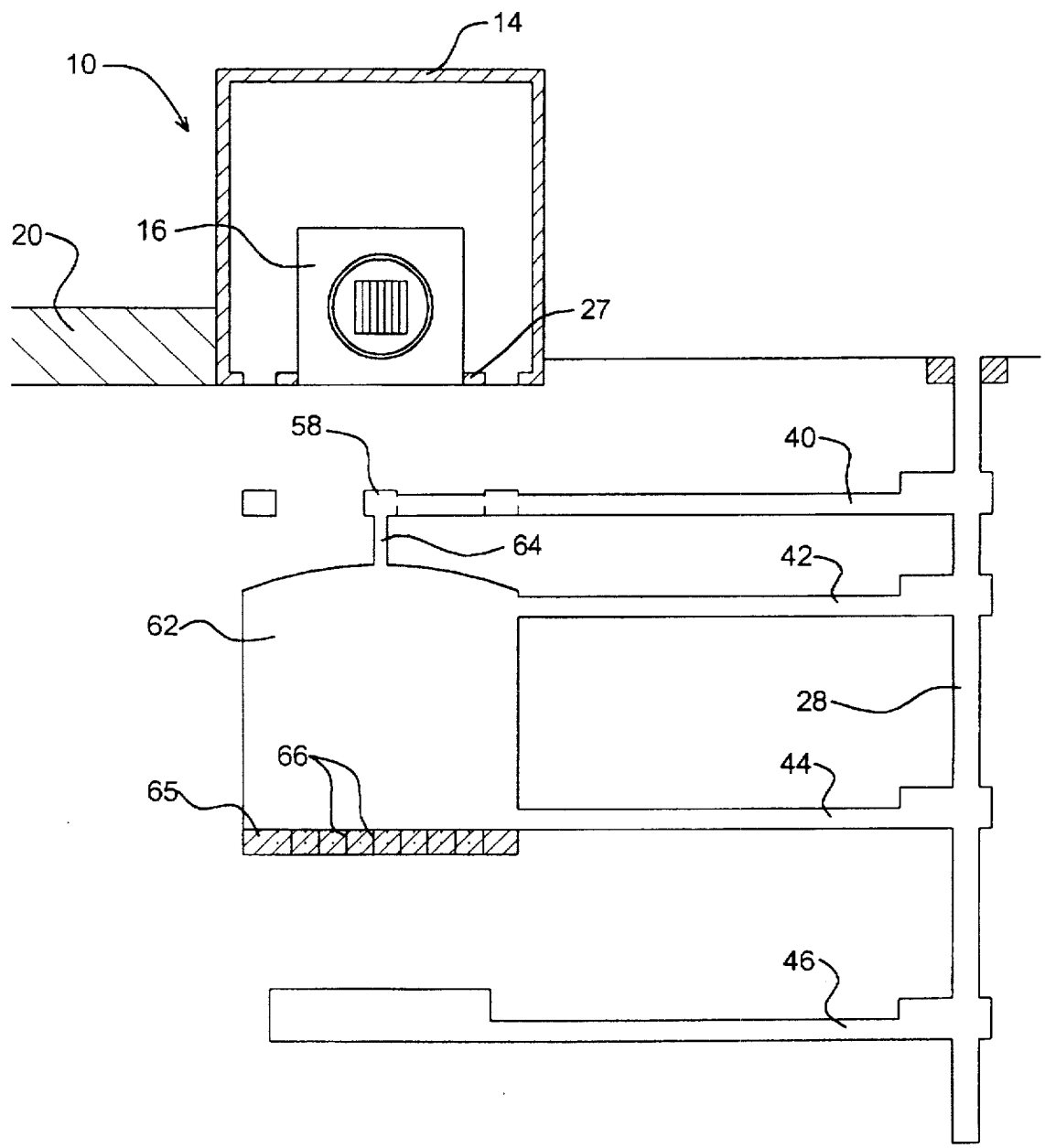
Figure 6A:
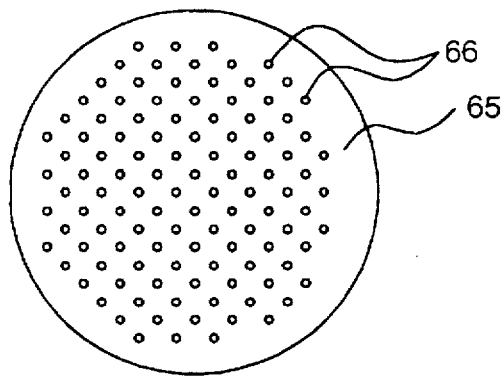
FIG. 6A is a top plan view of the lower base structure.

In FIG. 5, there is shown the next step of excavating the earth strata 60 between the two main chamber sections 48 and 50 to form the single large open main chamber or cavern 62 (See FIG. 6). As will be described later herein, this main chamber 62 is constructed to receive the reactor 16 and the ground strata section (which will be called the "earth core") immediately below the reactor 16 for eventual entombment. Further a vertical access shaft 64 is formed between the upper portion of the main chamber 62 and the upper central chamber 58.

b. Installing the Main Support Structure (FIGS. 6 and 7)

The first step (See FIG. 6) is to provide on the floor of the main cavern 62 a lower base structure 65, desirably in the form of a reinforced concrete slab. This has a plurality of through openings 66 formed therein to accommodate the freeze/thaw pipes (to be described later).

The next step is shown in FIG. 7, which is to construct a concrete cylindrical sidewall 68 which lines the entire interior side surface of the main cavern 62. Further a truss-like roof support structure 70 is provided at the top of the cylindrical sidewall 68. Finally, vertical bore holes 72 for freeze/thaw pipes are constructed through the rock strata beneath the lower support 64.

Also, an inclined access shaft 74 (i.e. a raise) is excavated from the central chamber 58 to open at 76 in the reactor building 14.

c. Installing the Freeze/Thawing System and Drilling the Vertical Bores (FIG. 8)

Figure 8:
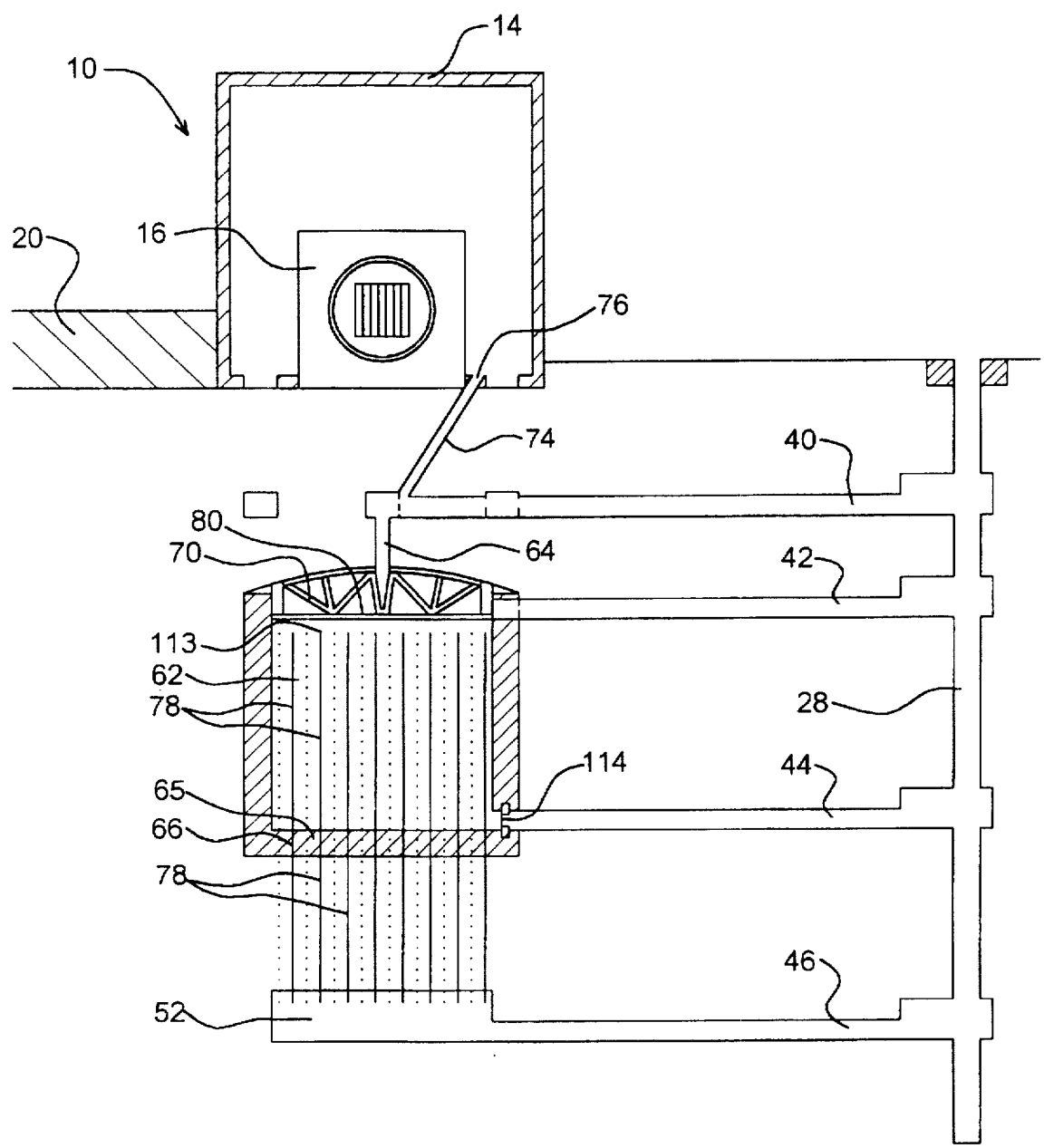
Figure 8A:
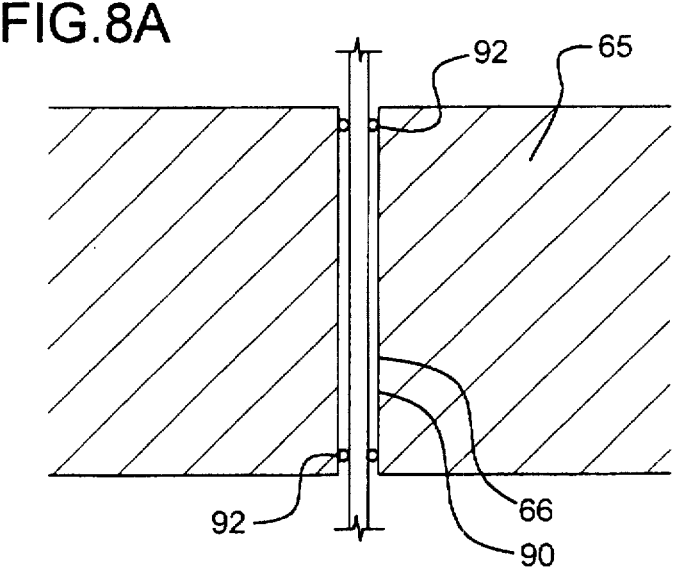
FIG. 8A is an enlarged plan view of the upper thermal plate.
Figure 8B:
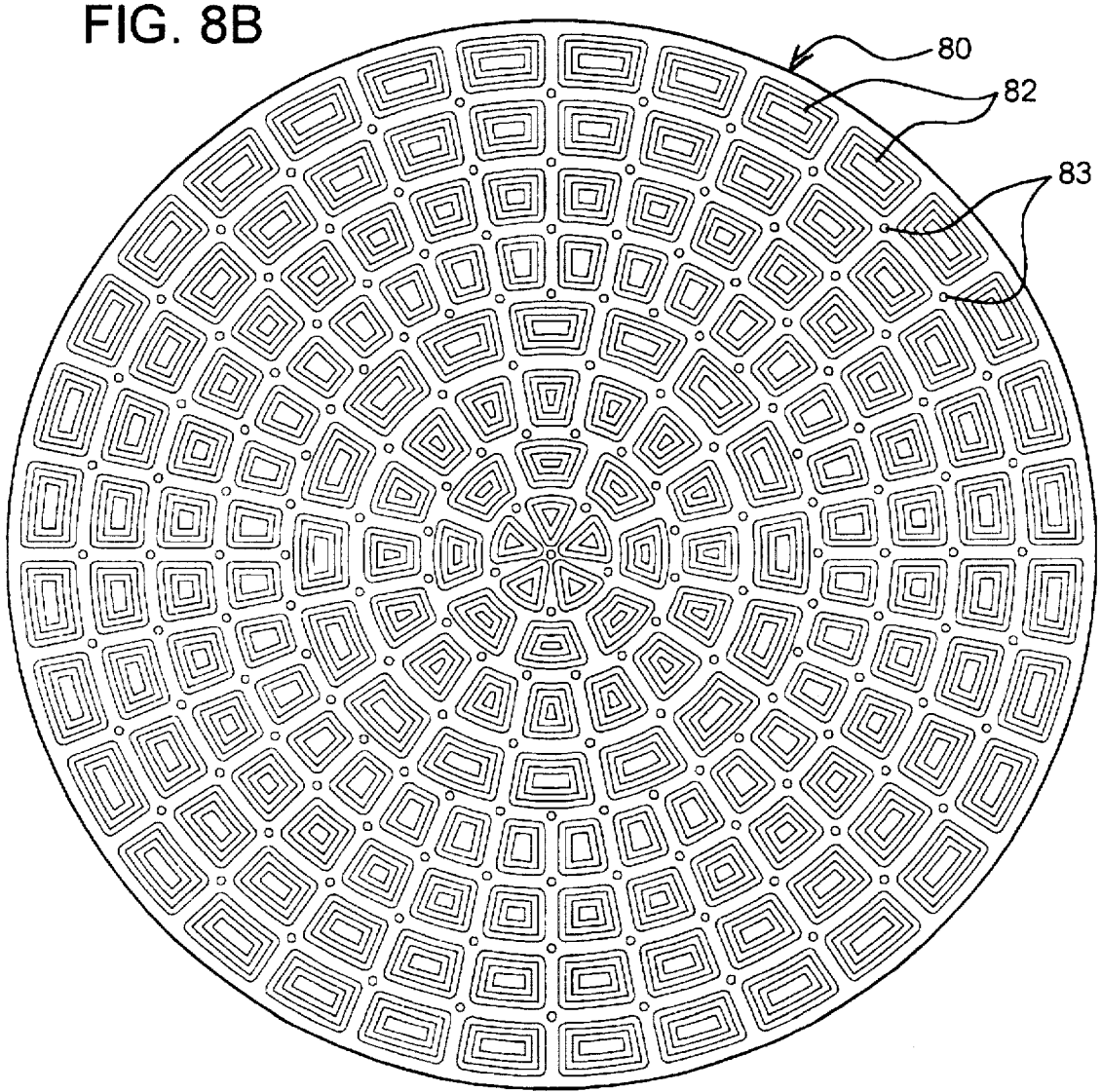
FIG. 8B is a sectional view taken through the base slab showing the sealing arrangements for the freeze/thawing pipes.

As shown in FIG. 8, a plurality of freeze/thaw pipes 78 are installed in the main chamber 62. These freeze/thaw pipes 78 are installed in sections, and then positioned to extend downwardly through base openings 66 and through the openings 72 into the earth strata below the lower base member 64. Also, there is installed against the lower part of the roof structure 70 a thermal plate 80 which is a structural support plate having therein a plurality of heating elements 82 (see FIG. 8B) which can be heated to melt the ice structure at its upper surface. This thermal plate 80 has a plurality of through openings 83 which water melted from the support ice can flow through the passageways 64 and 74 to the ground surface.

d. Forming the Ice Support in the Main Cavern and Melting the Ice in a Controlled Manner to Lower the Reactor Unit and the Underlying Earth Strata Core Downwardly Toward the Main Cavern. (FIGS. 9 Through 12).

In FIG. 9, there is shown the water 84 being directed downwardly through a conduit in the passageways 74 and 64 to flow into and fill the main chamber 62.

Figure 10:
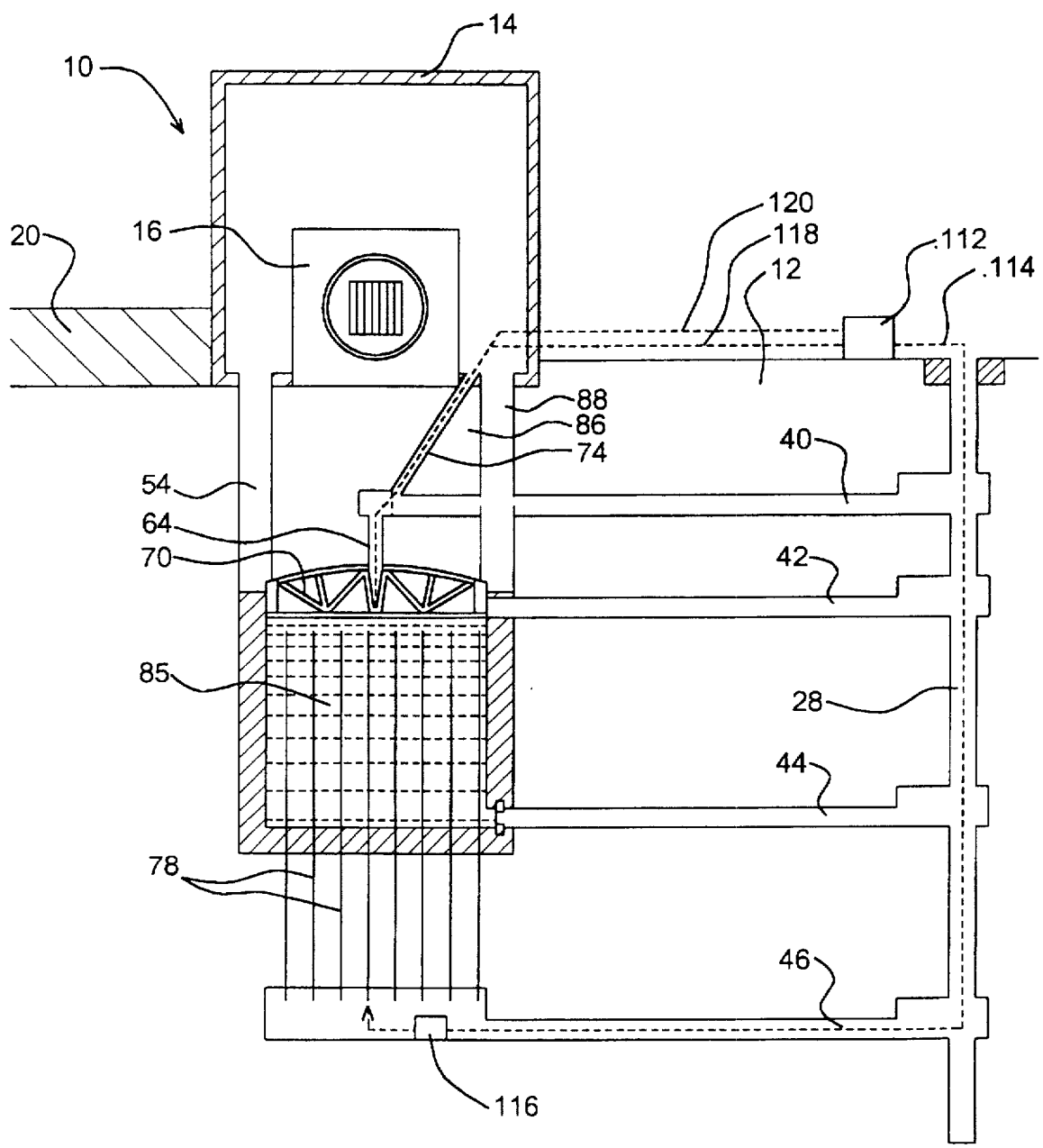

In FIG. 10, there is shown the freezing of the water 84 to form an ice support structure 85, by passing refrigerated brine through the freeze/thaw pipes 78. After the ice support block 85 is formed, the earth strata surrounding the earth strata portion 86 (i.e. core) immediately below the reactor is excavated to isolate the earth strata core 86 to position immediately below the reactor 16 and above the roof structure 70. This is done by excavating from the ring adit 54 upwardly and downwardly to form a cylindrical excavation 88 entirely surrounding the earth strata core 86 and isolating it from the surrounding earth strata 12.

Figure 11:
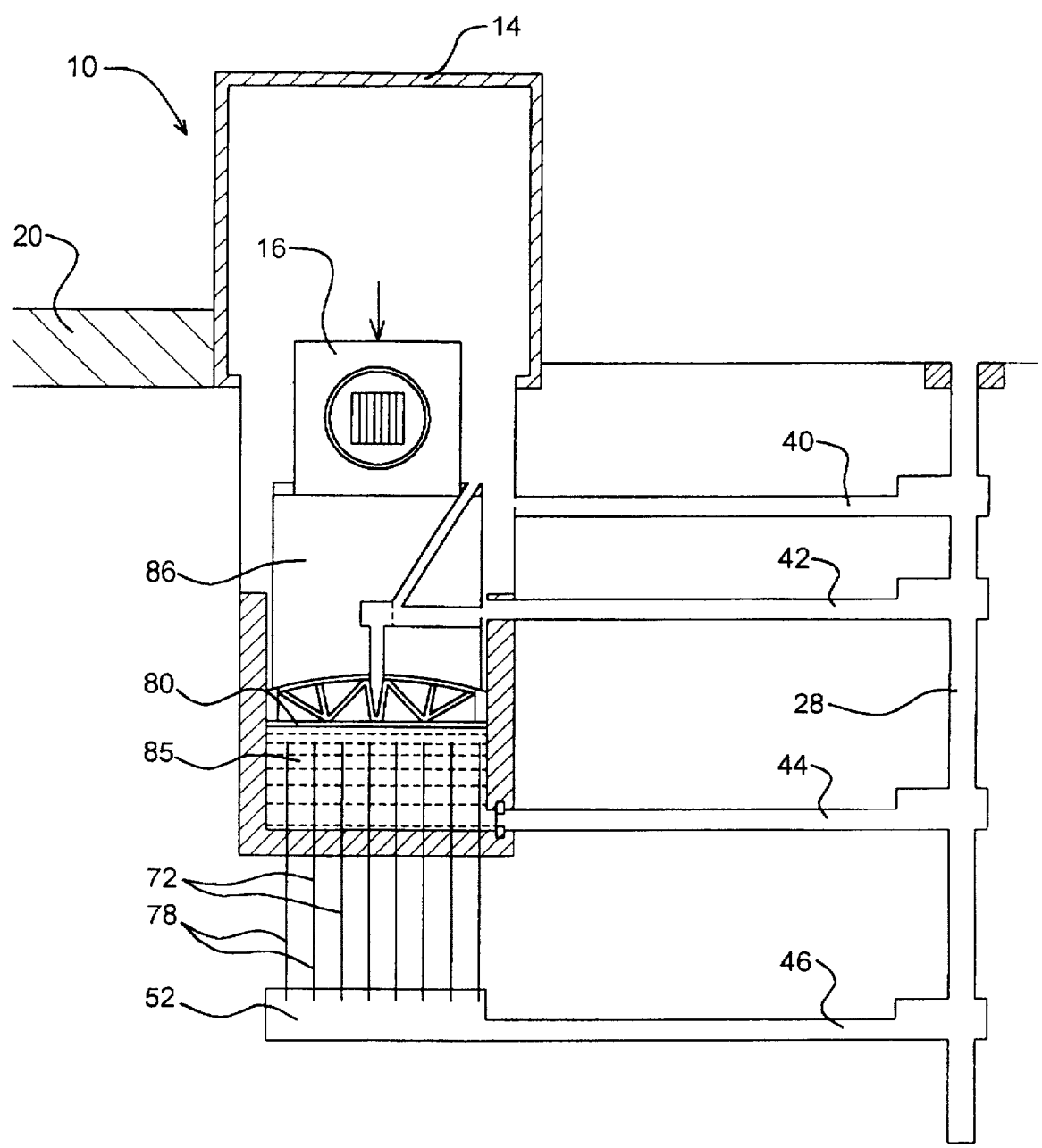

In FIG. 11, there is shown the controlled lowering of the nuclear reactor 16 by electrically powered heating elements 82 to melt the ice block or ice support 85 at its upper surface. As this occurs, the freeze/thaw tubes 78 are lowered in incremental steps into the holes 72 in a manner to be described in more detail later herein.

Figure 12:
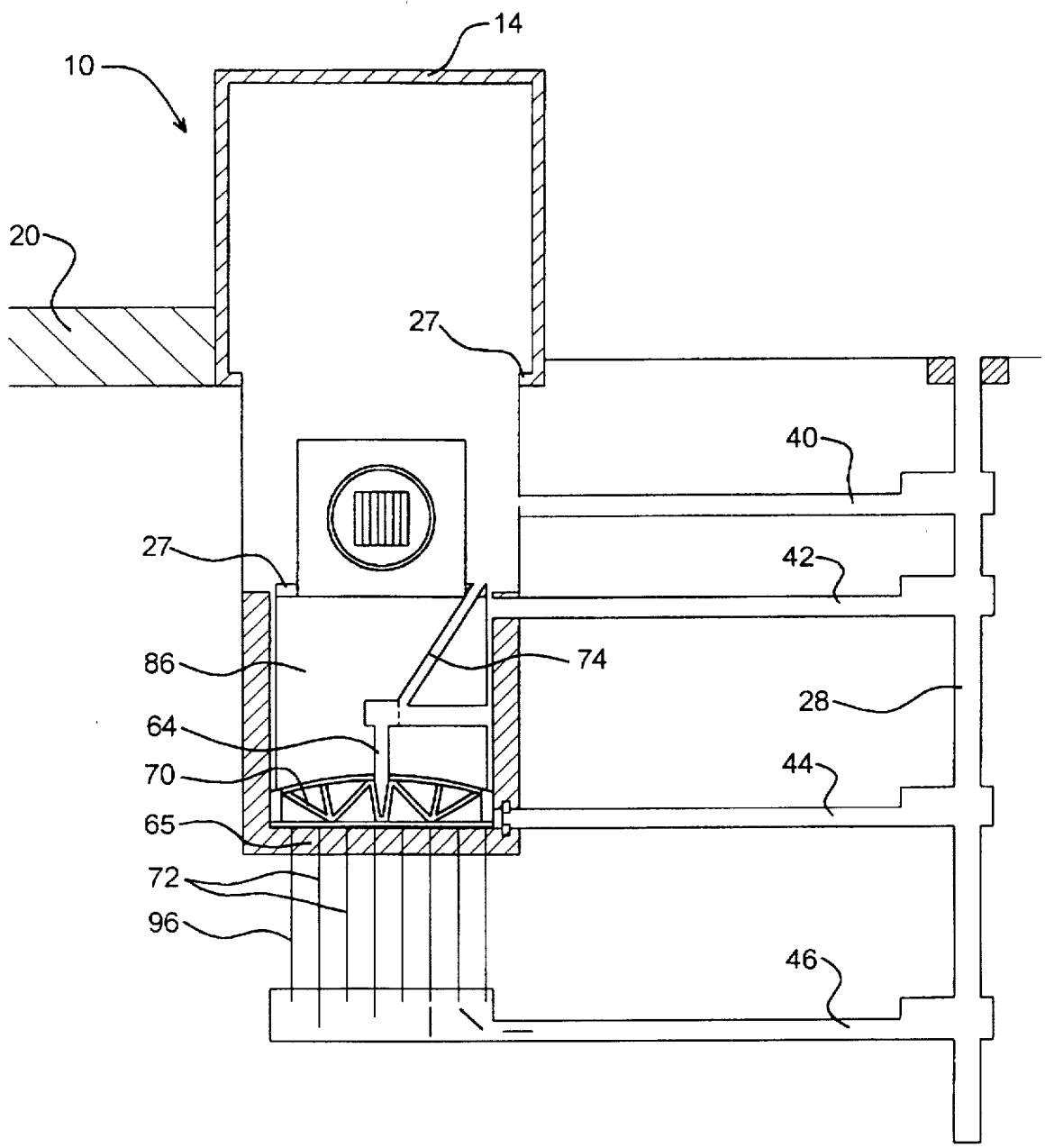

The completion of the lowering of the reactor 16 is shown in FIG. 12, with the upper roof structure 70 resting on the lower base member 65.

e. Final Entombment

Figure 13:
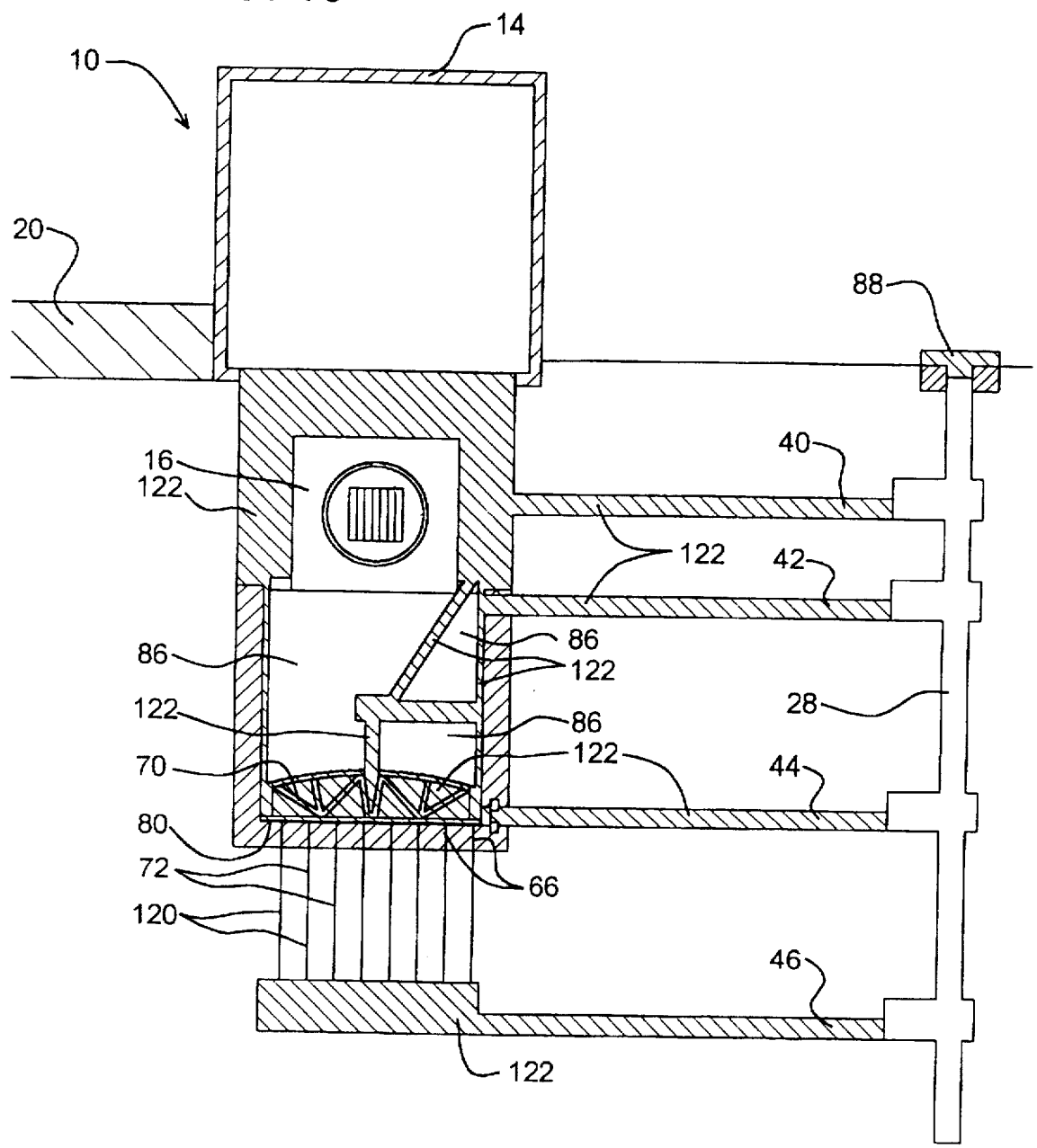

As shown in FIG. 13, the shaft 28 is capped at 88 with a reinforced concrete seal. All of the man made penetrations are sealed, and all of the excavated areas are backfilled. Also, measures are taken to isolate the reactor from ground water, and this is monitored by suitable instrumentation (to be described later herein).

3. More Detailed Description of the Process and Apparatus

In this more detailed description, the text will be divided into five sections having the same headings as the five sections of the above general description. To distinguish the headings of this more detailed description, the letter designations for each section which follows will be in capital letters A through E corresponding to the earlier heading designations, which are lower case letters a through e.

A. Initial Excavation (FIGS. 2–5)

As shown in FIG. 2, the access shaft 28 is excavated, and this can be done by using conventional construction and mining techniques. As the shaft 28 is being dug, concrete lining is placed around the side surface of the shaft. The collar 30 can be a reinforced concrete ring or cylinder which extends around the upper end of the shaft 28. This collar 30 is able to give vertical support to the structure, if need be. Also, it would provide a foundation which can be set to support facilities which would service the operation through the shaft during the ensuing process.

Also, as shown in FIG. 2, the reactor 16 is isolated, and this is accomplished by breaking though slab 27 to remove a portion of the concrete to form a ring-like trough, extending entirely around the reactor 16. Conventional concrete breaking techniques can be used, such as jack hammers, etc.

In some instances, instead of simply entombing the reactor 16, it may be desirable to entomb the entire building 14 with the reactor unit 16 still within it. In this instance, the building 14 plus the reactor unit 16 would be considered (for the purpose of this description) to be the reactor unit which is to be entombed. In that case, the entire building 14 with the reactor unit 16 would be isolated from any other building structure, such as breaking its connections or connecting foundations away from other structures in the facility.

With reference to FIG. 3, there are shown the shaft stations 32, 34, 36 and 38 being dug at different levels of the shaft 28. These are simply enlarged chambers which would enable certain operations to be carried on more conveniently. For example, the ground strata removed from various chambers and tunnels would be collected in the station chambers 32–38 and then moved upwardly through the shaft 28. Also, equipment and structural components and materials would be lowered downwardly through the shaft 28 into the related chambers 32–38 to be moved through the adits 40–46.

The adits 40–46, can be formed by conventional mining/ construction type techniques. With reference to FIG. 4, the two main chamber sections 48 and 50 can be excavated by conventional mining/construction techniques. If the ground strata is somewhat unstable, then various techniques could be used to provide the required stability, such as grouting, ground anchors, and other techniques. This is also true of all of the other excavating steps described in this text.

The lowermost chamber 54 is an operating chamber which is utilized during the freeze/thaw process after the ice block 84 has been formed in the main chamber, and the ice block 84 is systematically melted. As will be described later herein, the freeze/thaw pipes 78 are lowered in increments downwardly as the height of the ice support 84 diminishes, and as this happens, the lower sections of the pipe 78 are removed in the chamber 52. This will be described later herein.

The aforementioned box adit 54 may be lined with concrete to form a structural support for structural components which will extend upwardly from the box adit 54 around the nuclear reactor 16. The connecting tunnel 56 and also the central chamber 58 may also desirably be lined with concrete.

In FIG. 5, the aforementioned vertical shaft section 64 is drilled to interconnect the central chamber 58 with the upper chamber 48. Also, the earth strata between the chambers 48 and 50 is excavated and removed out through the adits 42 and 44. As indicated previously, additional support is used as needed.

B. Installing the Main Support Structure and Drilling the Freeze/Thaw Vertical Bores (FIGS. 6 and 7)

As discussed above, the lower base structure 65 is put in place on the bottom floor of the cavern 62. Desirably, this is a circular base made of reinforced concrete. The vertical holes 66 each have a metal liner 90, with "O" rings 92 being provided at the upper and lower end of each metal liner 90 to seal the space between the liner 90 and the surrounding concrete. (See FIG. 8A). The rock strata that is below the chamber 62 may be adequate to properly support the lower base member 64.

If needed, additional support could be provided by drilling holes downwardly into the strata below the base 65 and then injecting a cementitious epoxy, or other grout material which would emanate from the holes into the surrounding ground structure beneath the base 65 to stabilize the ground structure. Also, pilings could be used, ground anchors, etc.

In FIG. 7, there is shown the cylindrical sidewall 68 being constructed in the chamber 62. Again, prior to and during construction of this cylindrical sidewall 68, additional strata stabilizing techniques could advantageously be used, such as grouting, ground anchors, etc. Also, desirably the wall 68 could be made water impervious to provide a barrier to the inflow of water, and this could desirably be done with other components which define the chamber 62 and areas leading thereto.

The roof structure 70 is provided at the upper end of the cylindrical wall 58, and this roof structure 70 can conveniently be made as a steel truss-type roof support. Its primary purpose is to provide vertical support for the reactor 16 and the portion of the ground strata (i.e. core) immediately below the reactor 16. The truss structure 70 is initially supported by perimeter support members (indicated somewhat schematically at 94). These are arranged to provide sufficient support to support the roof structure 70 when it is not carrying the full load of the reactor unit 16 and the earth strata core 86 immediately above. The support members 94 are further designed to be removed when the structure has been made ready for lowering.

Also, as indicated previously, the shaft or tunnel section 74 (also called a "raise") is excavated from the central chamber 58 to an opening 76 leading into a building 14. This provides access from the interior of the reactor building 14 down to the central chamber 58, both for human movement and also for the movement of materials.

To drill the vertical drill holes 72, conventional drilling techniques can be used. Each of these holes 72 is aligned with a related through opening 66 in the base 64. There is provided for each drill hole 72 and its related through opening 66 a steel liner 96.

C. Installing the Freeze/Thawing System (FIG. 8)

The aforementioned upper thermal plate 80 is connected to the lower side of the roof structure 70 by conventional means. The heating elements 82 in the thermal plate 80 can be arranged singly or in sets. Each set could comprise a plurality of elements, each coiled around itself. Further, these would be controlled independently to provide controlled melting of the ice and controlled lowering of the reactor or large structure. For example, there could be different controllers transmitting power, at various levels, to different quadrants of the thermal plate. Alternatively, the heating elements 82 could be tubular, with hot water or brine being passed therethrough to accomplish the heating. The heating brine or water would be transmitted through a pipe or pipes extending through the shafts 74 and 64. Also, as indicated previously, there is a plurality of through openings 84 in the thermal plate 80.

With the upper thermal plate 80 in place, the next step is to install the freeze/thaw pipes 78. These pipes 78 extend all the way from a location a short distance below the roof structure 70 downwardly through the holes 66 and through the drill holes 72.

To describe the freeze/thaw pipes 78 further, reference is made to FIG. 10A which shows the upper end of one pipe 78. Each pipe 78 comprises an outer conduit 98 and a concentric inner conduit 100, with the two conduits 98 and 100 forming an outer annular passageway 102, and with the inner conduit 100 forming an inner passageway 104. The outer conduit 98 is closed with an upper end cap 106. The flow pattern of the brine (either freezing or heating brine) is upwardly through the inner passageway 104, around the upper edge of the inner conduit 100, and thence downwardly through the outer annular passageway 102.

Figure 12A:
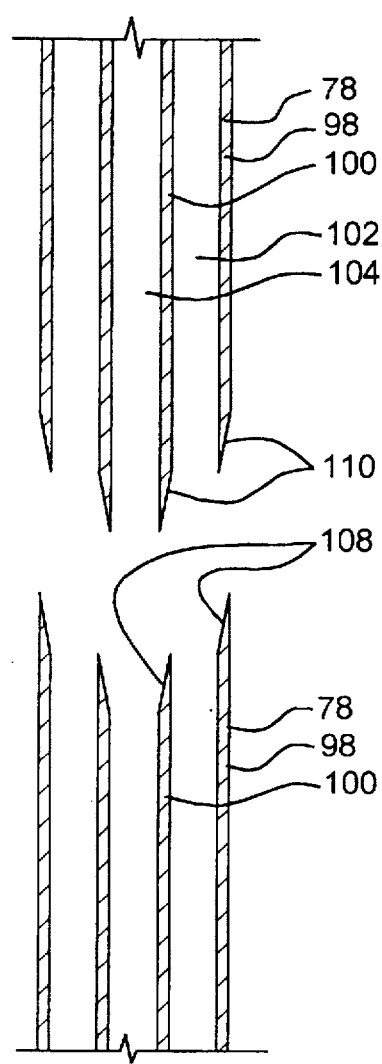
FIG. 12A is a side elevational view, drawn to an enlarged scale, showing adjacent ends of two of the freeze/thaw pipe sections separated from one another.

With reference to FIG. 12A, it can be seen that each pipe 78 is made in sections, with each section having an end connection which is a tapered threaded end. In FIG. 12A, it can be seen that the lower pipe section 78 has its two conduits 98 and 100 having their upper end tapered surfaces 108 slanting upwardly and radially outwardly, while the lower end of the pipe section immediately above has its tapered surfaces 110 starting from a lower end location also sloping upwardly and radially outwardly, so that the surfaces 108 and 110 can threadedly engage one another. This can be accomplished in a conventional manner. Spacing members can be placed in the annular passageway 102 to maintain the outer and inner tubes 98 and 100 properly positioned with respect to one another.

With further reference to FIG. 8, it can be seen that with the pipes 78 initially installed in the main chamber 62, each of these pipes 78 has its upper end 113 positioned a short distance below the thermal plate 80 and extends downwardly and through its bore holes 72 and through the upper wall surface 112 of the lower operating chamber 52. With the freeze/thaw pipe 78 thus installed, a water tight door 114 is installed to close off the adit 44 leading into the lower end of the main chamber 62.

D. Forming the Ice Support in the Main Cavern and Melting the Ice in a Controlled Manner to Lower the Reactor Unit and the Underlying Earth Strata Section Downwardly Toward the Main Cavern. (FIGS. 9 Through 12)

As shown in FIG. 9, water 84 is directed into the main chamber 62 to fill the chamber 62 up to the level of the upper base plate 80. The water is directed from a source above the ground through the passageways 74 and 64 onto the upper thermal plate 80 to flow through the openings 83 into the main chamber 62. FIG. 9 shows the chamber 62 approximately half filled with water 84.

After the water has been directed into the main chamber 62, low temperature brine is directed through the freeze/thaw pipes 78 to cause the water to freeze. When the water is in the chamber 62 and then frozen, the ice that is formed expands, and this may result in some "humping up". To alleviate the effect of this, the water can be introduced into the main chamber 62 up to a level moderately below the thermal plate 80. After the freezing is completed, then a lesser amount of additional water can be directed onto the upper surface of the ice that has already formed, and this will freeze in a pattern closer to a horizontal planar upper surface. This process could be repeated more than once, and water could be added in yet smaller increments until the ice block 85 is formed to be immediately adjacent to the lower surface of the thermal plate 80.

Prior to directing the water 84 into the main chamber 62 instruments would be placed at various locations in the main chamber 62 to sense temperature. These could be thermo couples 111 which would be suspended from wires which extend across the chamber 62 at various laterally spaced horizontal locations and various elevations. The thermo couples would be connected to conductive wires that would extend upwardly through the shaft 64 and 76 to a control area above the ground level. When the ice block (i.e. ice support 85) that is later formed begins to melt, and the upper supporting thermal plate 80 descends onto the various thermo couples, the support wires for the thermo couples would simply break loose, thus making these thermo couples inoperable. Such a thermo couple is shown schematically at 111 in FIG. 10A.

One of the main reasons for providing these thermo couples 111 is so that the temperature of the ice support 85 can be monitored in various location to make sure that it is of a substantially uniform temperature. If the temperature is not uniform, there may make more of tendency for the ice to melt unevenly. The temperature could be controlled by operating the valves controlling the flow of the brine to the freeze/thaw pipe(s) 78.

To accomplish this, there is shown schematically in FIG. 10 an above ground control apparatus 112 having an operative connection at 114 to control the flow of brine to the various pipes 78. This would be done by suitable valves at either the above ground apparatus 112 or at a lower location, indicated schematically at 116 in FIG. 10. Suitable refrigeration/heat exchange apparatus would be included to provide the brine at the desired temperature.

There is shown another operative connection at 118 extending from the control center 112 downwardly through the passageways 74 and 64 to connect to the thermo couples or other sensors embedded in the ice structure 85. Further, suitable sensors would be provided in the upper thermal plate 80 to indicate whether it is horizontal. This information, along with the temperature information would be transmitted to the control center 112. The control center 112 has another operative connection indicated schematically at 120, which controls the power that is being directed to the heating coils 82 in the upper thermal plate 80. Thus, when the thermal plate 80 is slanted from the horizontal, the signal indicating this misalignment would be sent to the control center 112, which would change the heating pattern in the thermal base plate 80 to bring the thermal base plate 80 closer to the horizontal position.

After the formation of the ice block 85 has been completed, the next step is to excavate the annular isolating chamber 88 that surrounds the earth strata portion (i.e. the earth strata core 86) lying immediately beneath the reactor 16. To accomplish this, the uppermost adit 54 is utilized as a means to accomplish this excavation of the isolation chamber 88. Conventional mining techniques could be used. For example, there could be several raise machines which would drill either upwardly or downwardly or in both directions. Also, there could be utilized blasting, mechanical diggers, and also a certain amount of handwork. At the completion of the excavation of the isolating chamber 88, the mass of the reactor and the earth strata core 86 below the reactor 16 are isolated from any support from the surrounding earth strata and support from any other structure at the power plant facility 10. At this time, the support is provided entirely from the ice support block 85.

With reference to FIG. 11, the next step is to heat the upper thermal plate 80 to cause the ice block 85 to begin to melt at its top surface.

During the melting of the ice block 85, it becomes necessary to move the freeze/thaw pipes 78 downwardly to avoid contact with the descending thermal plate 80. This can be accomplished by running hot brine upwardly through the center passageway 104 and downwardly through the outer annular passageway 102 to thaw the ice immediately adjacent to the surface of that particular pipe 78. Then that pipe could be lowered a short distance (e.g. a meter or so) into the lower operating chamber 52, and one of the pipe sections removed. Then the pipe 78 could be reconnected to the related hose, and then the flow of cold brine could be continued. As a practical matter, as soon as the hot brine stops flowing through any particular pipe, because of the surrounding ice, the refreezing will likely take place almost immediately, even before the cold brine has begun to be circulated through that pipe.

Figure 11A:
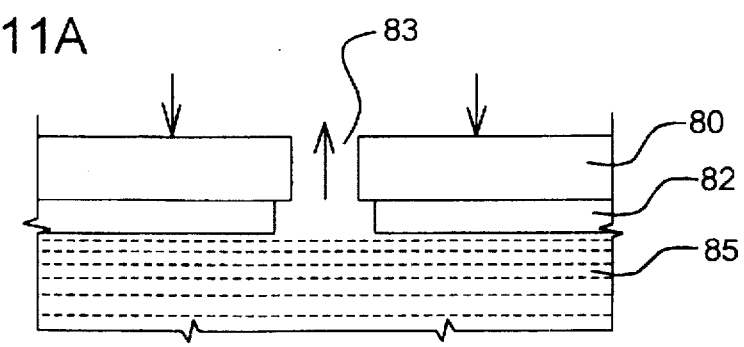
FIG. 11A is a sectional view drawn to an enlarged scale, showing a portion of the roof structure circled at 11A in FIG. 11.

As the upper surface of the ice block 85 melts, the water at the upper surface of the ice block 85 flows upwardly by pumping through the openings 83 in the thermal base plate 80 into the area occupied by the roof truss 70. This water then flows upwardly through appropriate conduits in the shafts 64 and 74 and thence outwardly to some other location. It should be kept in mind that the reactor unit 16 and the earth core 86 immediately below the reactor unit 16 act as a piston forcing the melted water upwardly through the thermal plate where it is collected. A pump or other means could be used to remove the water. (This is illustrated in FIG. 11A, where there is shown the thawing of the ice block at the interface, with the water being displaced upwardly through the opening 83.)

Each of the freeze/thaw pipes 78 could be thawed and lowered (with the lower pipe section being removed) in sequence until all of the pipes have been lowered a certain incremental distance and had their lower pipe sections removed. After this has been accomplished with all the pipes, the process of heating the thermal plate 80 continues the melting at the upper surface of the ice block 85. After a number of sequences of this, the reactor 16 and the earth core 86 below has been lowered to its final entombment depth. When this is accomplished, the rest of the freeze pipes are totally removed from the liners 90. Also the water tight door 114 is removed from the adit 44.

E. Final Entombment

Now the "entombment" of the reactor 16 and its associated earth strata core 86 is to be accomplished. First, grout is applied into the freeze pipe openings 66 and 72, this being indicated at 120. Next, concrete is poured around the fully lowered reactor 16 and the earth strata core 86, and also in the various passageways and adits, this being indicated at 122 at various locations in FIG. 13.

After this has been completed, active and/or passive control of ground water flow in the vicinity of the reactor 16 and its associated earth strata core 86 could be accomplished. One method would be to provide a totally waterproof barrier around the entire block (reactor 16 and earth strata portion 86). A second method would be to place conduits or some other means to divert water in the areas surrounding the reactor 16 and earth strata portion 86. Holes would be drilled downwardly around the entire perimeter of the entombment area, and then water would be withdrawn and diverted to some other location away from the reactor 16.

It is to be recognized that various modifications could be made in the present invention without departing from the basic teachings thereof.

We claim:

1. A method of lowering an environmentally critical structures, such as a nuclear reactor unit, or other critical structure, into an ground strata, comprising:
   a. excavating a cavern in the ground strata at a location below the critical structure;
   b. filling the cavern to a predetermined support level with water;
   c. freezing the water to form an ice support;
   d. isolating the critical structure and any underlying portion of the ground strata positioned between the critical structure and the cavern; and
   e. thawing the ice support to cause the critical structure, along with any of said underlying portion of the ground strata, to descend into the ground strata toward the cavern.

2. The method as recited in claim 1, further comprising placing an upper heat transfer structure at an upper location of said cavern, and transferring heat from said upper heat transfer structure to an upper portion of said ice support to melt said ice support downwardly and thus lower said critical structure toward said cavern.

3. The method as recited in claim 2, further comprising moving water melted from said ice support upwardly through passageway means to be removed from said cavern.

4. The method as recited in claim 2, further comprising providing in said cavern a vertically aligned enclosing sidewall to define an ice forming chamber, filling said ice forming chamber with said water and freezing said water to form said ice support within said sidewall, with said upper heat transfer base structure descending into said ice forming chamber.

5. The method as recited in claim 1, wherein said underlying portion of ground strata below the critical structure is isolated by excavating a portion of ground strata surrounding said underlying portion of the ground strata to be supported primarily by said ice support.

6. The method as recited in claim 1, further comprising placing a plurality of freeze pipes in said cavern, and passing a cooling heat exchange medium through said freeze pipes to cause said water to freeze to form said ice support.

7. The method as recited in claim 6, wherein said freeze pipes are lowered downwardly in said cavern by heating said freeze pipes to melt ice adjacent thereto and then lowering said freeze pipes.

8. The method as recited in claim 7, further comprising lowering said freeze pipes at least partially into a lower operating chamber positioned beneath said cavern, and then passing more of said cooling medium through said freeze pipes to maintain desired temperature in said ice support.

9. The method as recited in claim 1, comprising forming a generally vertical access shaft into the ground strata at a location spaced laterally from said critical structure, then forming laterally extending adit means to an area adjacent to a ground strata location below said critical structure, then excavating said cavern by passing excavated material through said adit means and through said access shaft.

10. The method as recited in claim 9, further comprising forming a second adit means leading from said access shaft to a location adjacent to an area below said critical structure, and forming a ring adit extending around an area below said critical structure, and then isolating the underlying portion of the ground strata by excavating the material between said ring adit and an upper location adjacent to and extending around a location of said critical structure.

11. The method as recited in claim 9, further comprising forming an adit from said access shaft laterally to a location below said cavern, and forming an operating chamber beneath said cavern, said method further comprising forming vertical holes through ground strata extending from said cavern to said operating chamber, then inserting freeze pipes to extend into said vertical holes and also extend upwardly into said cavern, and causing heat transfer between said freeze pipes and the water in the cavern to form the ice structure.

12. The method as recited in claim 11, wherein said freeze pipes are lowered downwardly in said cavern by heating said freeze pipes to melt ice adjacent thereto and then lowering said freeze pipes.

13. The method as recited in claim 12, further comprising lowering said freeze pipes into a lower operating chamber positioned beneath said cavern, and then passing more of said cooling medium through said freeze pipes to maintain desired temperature in said ice support.

14. The method as recited in claim 9, further comprising forming in said cavern a lower base structure over a bottom surface of said cavern, forming a vertically oriented surrounding sidewall defining an ice forming chamber within said cavern, and then forming a roof support structure at an upper location of said cavern above said ice forming chamber, said method further comprising excavating ground strata surrounding an underlying portion of the ground strata below said critical structure to cause the critical structure to be supported primarily on said roof structure, so that as the ice support melts, the underlying portion of the ground strata and the critical structure moves downwardly toward the cavern.

15. The method as recited in claim 2, wherein said upper heat transfer structure comprises a plurality of heat transfer sections, said method further comprising controlling transfer of heat to said heat transfer sections to control rate of melting adjacent to said heat transfer sections to maintain said heat transfer structure at a desired orientation as said ice support is being thawed.

16. The method as recited in claim 15, wherein said heat transfer structure comprises a plurality of electrical heating elements, and flow of electric power to said electric heating elements is controlled to achieve desired orientation of said heat transfer structure.

17. The method as recited in claim 1, wherein access passageways are excavated in said ground strata leading to a ground strata portion beneath said critical structure, said method further comprising the step of filling said passageways with material to close off said passageways and thus entomb said critical structure.

18. The method as recited in claim 17, wherein said critical structure comprises a nuclear reactor unit.

19. An entombed critical structure installation used to entomb and isolate a critical structure from surrounding environment, made in accordance with the method of claim 17, wherein said critical structure is positioned beneath a surface of the ground strata in said cavern, and the passageways leading to the cavern are closed by having been filled with material.

20. The entombed critical structure installation as recited in claim 19, wherein said critical structure is a nuclear reactor unit.

* * * * *